A. B. SHAW.
BUCKLES.
No. 7,141. Reissued May 30, 1876.
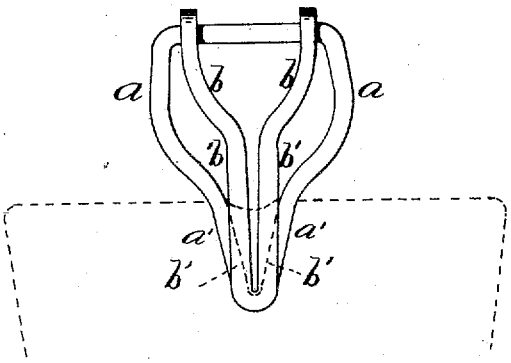
Fig. 1
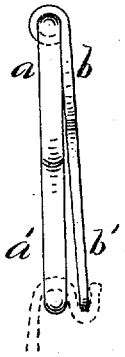
Fig. 2.
Fig. 3.
WITNESSES
B. W. McCurdy
R. A. George
A. B. Shaw INVENTOR
By his Att'ys.
Henry W. Williams & Co
N. PETERS, PHOTO-LITHOGRAPHER, WASHINGTON, D. C.

UNITED STATES PATENT OFFICE.

AI B. SHAW, OF MEDFORD, MASSACHUSETTS, ASSIGNOR TO MARTIN W. CARR AND HIRAM W. BROOKS.

IMPROVEMENT IN BUCKLES.

Specification forming part of Letters Patent No. 141,729, dated August 12, 1873; reissue No. 7,141, dated May 30, 1876; application filed April 26, 1876.

*To all whom it may concern:*

Be it known that I, AI B. SHAW, of Medford, in the county of Middlesex and State of Massachusetts, have invented a new and valuable Improvement in Buckles for certain purposes, of which the following is a full, clear, and exact description, reference being had to the accompanying drawing, and to the letters of reference marked thereon.

This buckle is particularly intended for use in attaching and fastening ladies' stocking-supporters to the upper portions of the stockings; but it may be used in any other connection, or for any other purpose for which it is adapted as a mode or instrument of attachment.

In the accompanying drawings, Figure 1 is a front elevation of my buckle. A broken line shows a stocking or piece of cloth to which it is fastened. Fig. 2 is a side elevation of the same, the broken lines showing a section of a stocking in the same position as shown in Fig. 1.

Similar letters of reference indicate corresponding parts.

*a* is the frame of the buckle, crimped or bent into the shape shown at *a'*. *b* is the tongue, spreading at its upper portion, but bent at its lower portion *b'* into parallel, or nearly parallel, bars. The lower ends *a'* and *b'* extend to about the same length, and are both somewhat blunt, so as to avoid tearing or in any manner injuring the fabric to which it is attached.

The method of attaching the buckle to the top of a stocking, which is illustrated in Figs. 1 and 2, is simply and quickly performed. The buckle is laid upon the edge of the fabric, and the stocking-edge is drawn through the frame *a* and placed over the end *b'* of the tongue *b*. The harder the stocking is pulled the more tightly it is held in the buckle. The fabric will tear before it can be got away, so well does the buckle grasp the stocking; hence the tongue *b b'* is made blunt at the point.

The portion of the frame designated by the letter *a'* is crimped, so as to nearly conform to the shape of the tongue *b'*, in order to produce more friction, and to hold the fabric more steadily and tightly.

The top of the stocking may be attached to the buckle by merely crowding it into the part *b'* of the buckle, or in any other practicable manner.

As will be readily seen, this buckle is very simple, inexpensive, and almost impossible to break, while it performs the office for which it is constructed perfectly.

Having thus fully described my invention, what I claim, and desire to secure by Letters Patent, is—

1. The above-described buckle, consisting of the crimped frame *a a'*, and the blunt tongue *b b'*, constructed and arranged substantially as and for the purpose hereinbefore set forth.

2. In a stocking clasp or supporter, the tongue or clasp *b b'*, terminating in ends adapted to be attached to a bar or other support, all substantially as and for the purpose described.

AI B. SHAW.

Witnesses:
HENRY W. WILLIAMS,
B. W. WILLIAMS.